July 10, 1934.  J. F. DOWD ET AL  1,965,737
DISPLAY DEVICE
Filed March 25, 1931  2 Sheets-Sheet 1

Inventors
John F. Dowd
Elmore L. King
Robert C. Spencer
BY Harry Dexter Peck
Attorney July 10, 1934.    J. F. DOWD ET AL    1,965,737
DISPLAY DEVICE
Filed March 25, 1931    2 Sheets-Sheet 2

Inventors
John F. Dowd
Elmore L. King
Robert C. Spencer
By Harry Dexter Peck
Attorney Patented July 10, 1934

1,965,737

UNITED STATES PATENT OFFICE 1,965,737

DISPLAY DEVICE

John F. Dowd, Elmore L. King, and Robert C. Spencer, New York, N. Y., assignors to Livermore and Knight Company, Providence, R. I., a corporation of Rhode Island Application March 25, 1931, Serial No. 525,102

4 Claims. (Cl. 40—132)

This invention relates to improvements in display devices.

It is a principal object of this invention to provide a novel combination of means which under certain light conditions depicts a fanciful figure or design embodying as a harmonious element thereof what appears to be an ordinary mirror and which under other light conditions enables an observer to look through the apparent mirror and see an object therebeyond. The device may be installed as a permanent fixture but it is a further object to provide an assemblage of means which can be folded into a compact bundle to facilitate transportation and which can easily be unfolded and set up for display where desired. A feature of the device resides in its adaptation to the display of any kind of goods and the possibility of varying the display itself in many ways.

The representative devices herein particularly shown and described are merely illustrative of the best mode in which we have contemplated applying the principles of our invention and it is intended that the patent shall cover by suitable expression in the appended claims whatever features of patentable novelty exist in the invention disclosed.

Figure 1:
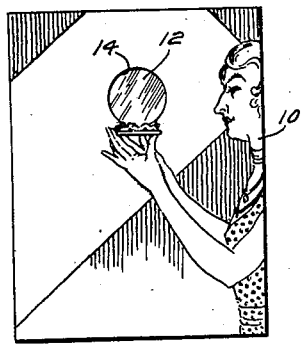
Figures 1 and 2 are front elevations of a device embodying our invention as seen under different light conditions.
Figure 2:
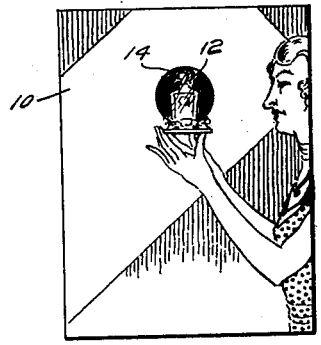
Figure 3:
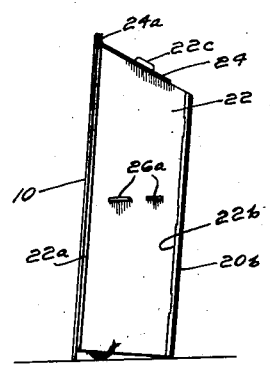
Figure 3 is a side elevation of the same.
Figure 4:
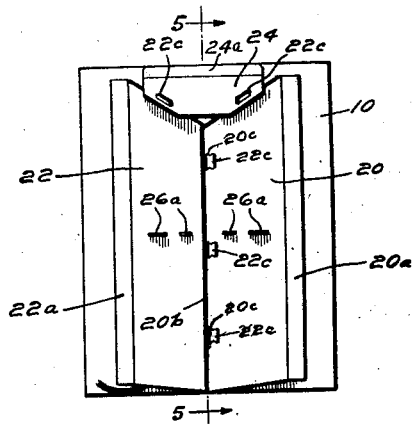
Figure 4 is a rear view.
Figure 5:
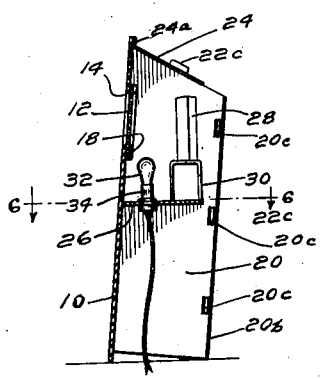
Figure 5 is a side elevation in section as on line 5—5 of Figure 4.
Figure 6:
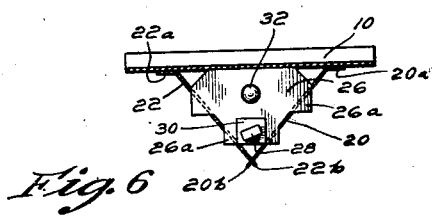
Figure 6 is a plan in section on line 6—6 of Figure 5.
Figure 10:
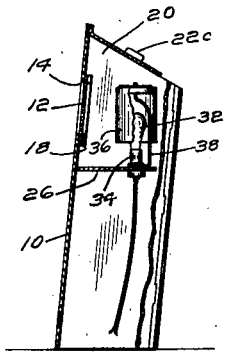
Figure 11:
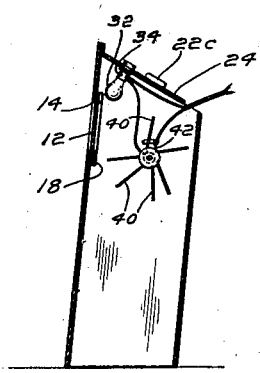
Figure 12:
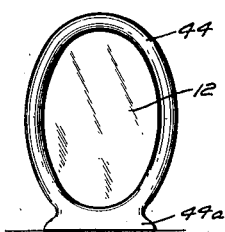
Figure 13:
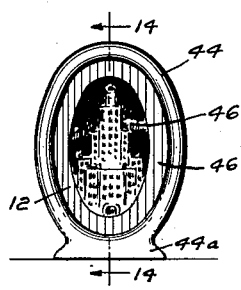
Figure 14:
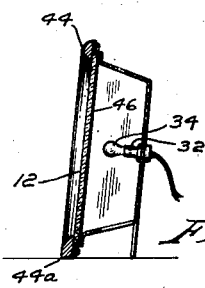

Figures 10 and 11 are views like Figure 5 but showing modified arrangements of the object and internal lighting means; and Figures 12, 13 and 14 are two front elevations and a side elevation in section on line 14—14 of Figure 13, respectively, showing a further application of the principles of the invention.

Referring more particularly to the drawings, the device shown in Figures 1 to 11 comprises a wall 10 on which may be depicted some sort of fanciful design which has as a harmonious element thereof what appears under certain light conditions to be an ordinary mirror or reflecting surface 12. In the particular design shown in Figures 1 and 2, this mirror represents a magic crystal or ball. It is in fact a plate of glass or the like mounted on the rear side of the wall adjacent an opening 14 therein. This plate is conveniently supported by marginal strips 16 of the same thickness and is held against lateral displacement by overlapping strips 18 attached to the marginal ones. (See Fig. 8.) The inner or rear surface of the plate is treated on one side with a coating of material which is a perfect reflector when the intensity of light behind it is less than in front and which is perfectly transparent when the relation of light intensities is reversed.

Behind this transparent mirror is a chamber formed in this instance by converging side walls 20, 22, a top 24, and a bottom or floor 26. The side walls and top are each preferably attached at one edge 20a, 22a, 24a to the rear face of the front wall in such manner as to permit them to swing toward and from the latter. When swung away from the front wall, the adjacent edges 20b, 22b of the side walls are removably secured together by tongue and slot connections as clearly seen in Figure 9. The edge 22b of one side wall has one or more wedge shaped tongues 22c and the adjacent edge 20b of the other side wall has one or more complementary slots 20c to receive the tongues. Each slot is of sufficient extent at one side to permit the widest part of the tongue to pass therethrough but narrows toward the other side to a degree where only the inner or narrowest part of the tongue can pass. Just beyond this throat or neck, as it were, the slot enlarges somewhat so that after the tongue has passed beyond the neck it can be withdrawn slightly until its diverging edges bring up against the edges of the slot, thus removably securing the side walls together. Similar connections between the top or cover and the side walls secure them together. At any desired level the floor or bottom 26 may be placed, there being tongues 26a on its sides which enter slots in the side walls.

When the cover, side walls and bottom are brought together as just described, they form behind the transparent mirror a chamber whose space is obviously darker than the space surrounding the device as a whole, assuming of course that said outside space is illuminated to some degree at least. Under such relative light conditions an observer looking at the device will see only as far as the coating on the inner face of the window and this will appear as a highly reflecting surface comparable in every respect to an ordinary mirror. But when the space in the chamber is made brighter than the space outside the device, the observer finds himself no longer looking at a mirror but actually seeing through it. This somewhat startling discovery piques the observer's curiosity and therein lies the attractive feature of the device as a display medium for the phenomenon experienced by the observer retains his attention and causes him to continue to view the device and thus focus his vision upon what is seen through the so-called mirror.

This may be a still object as shown in Figure 5, where a carton or container 28 is resting on a pedestal 30 so as to be in the line of vision through the mirror. Below the latter and out of the range of said vision is an ordinary electric lamp bulb 32 and device 34 which acts automatically to make and break the circuit through the lamp. Accordingly the space within the chamber is intermittently illuminated and thus the attention of the observer is drawn from the mirror to the object and vice versa with a somewhat mystifying but pleasing effect.

In Figure 10 the object takes the form of a hollow translucent cylinder 36 pivotally mounted on the wire support 38 so as to surround the lamp. By employing the well-known vane arrangement at the top of the cylinder the latter can be caused to rotate by the rising heat waves from the lamp. Thus the device lends itself to the use of a moving semi-transparent object which may be caused to pass between the mirror and inner light source.

Figure 11 illustrates how the lamp may be supported on the cover 24 and shows also a series of plates 40 which are rotatable to bring each one in succession into view behind the mirror. Such apparatus is well known and enables a number of different displays to be exhibited. The previously mentioned flashing device may be employed or if preferred a switch 42 associated with the revolving support of the plates may control the periods during which the lamp is lighted.

Figure 7:
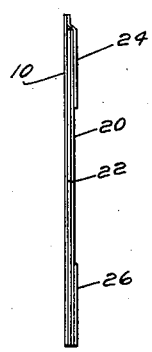
Figure 7 is a side view of the device in its compact or folded condition.
Figure 8:
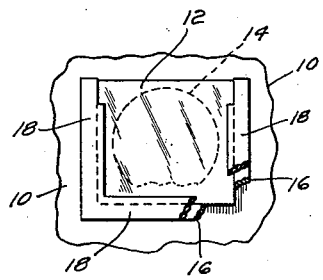
Figure 8 is a rear view of the section of the front wall embracing the transparent mirror.
Figure 9:
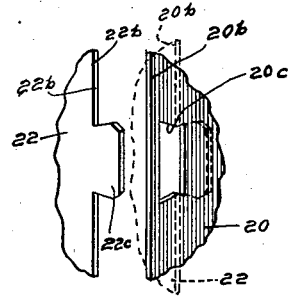
Figure 9 is a view illustrating how certain parts may be removably secured together.

The device shown in Figures 1-11 may be conveniently packed for shipment. The side walls and the top fold against the front wall and the floor may be laid there against as seen in Figure 7. Since the lamp and flashing device may be readily purchased at almost any electric store they need not be included with the folded parts forming the chamber. Consequently the device when ready for shipment need form but a thin flat package. By employing cardboard or the like for the walls the weight of the device is made negligible.

A more embellished form of device is shown in Figures 12-14. Here the device when viewed from the front appears as an ordinary mirror mounted in a suitable frame 44 with base 44a. Immediately behind the so-called mirror 12 is a partition 46 having an opaque border 46a and a translucent center portion 46b. On the latter may be directly depicted any suitable announcement or advertisement. If preferred, the portion 46b may be an opening and a semitransparent card may be placed over it so as to be removed and replaced by others as desired. Behind all this is a chamber embodying a flashing lamp. As milady stops to enjoy the anticipated reflection of the apparent mirror, her interest is suddenly aroused by the abrupt appearance of an entirely unexpected object and thus her attention is irresistibly directed to the message of the device.

We claim:

1. The combination of a casing, a translucent mirror positioned therein for reflecting the image of an observer substantially directly toward him, said casing having a space behind the mirror for receiving an object to be displayed, and means for illuminating the object so that it may by reflected light be observed through the mirror.

2. The combination of a casing, a translucent mirror positioned therein for reflecting the image of an observer substantially directly toward him, said casing having a space behind the mirror for receiving an object to be displayed, and means for illuminating the object so that it may by reflected light be observed through the mirror, said illuminating means being out of the direct line of vision of the observer when viewing the object for display.

3. A display device comprising a frame, a normally reflecting mirror in said frame capable of transmitting light rays therethrough, means at the back of said mirror rendering portions thereof around a sight opening opaque to light rays, a display at the rear of the mirror in spaced relation thereto and normally concealed thereby, and illuminating means behind the opaquing means and invisible from in front of the mirror for illuminating the display and rendering it visible through the mirror from in front of the mirror.

4. A display device comprising, in combination, a wall having as a part thereof a translucent mirror facing an observer; a chamber behind said mirror normally less illuminated than the side of said mirror toward the observer; an object in said chamber to be displayed; and means for illuminating the said object to a degree greater than that of the illumination on the observer's side of the mirror so that said object will be rendered visible to the observer by light reflected from the object through the mirror.

JOHN F. DOWD.
ELMORE L. KING.
ROBERT C. SPENCER.